(12) United States Patent
Shim et al.

(10) Patent No.: US 7,691,523 B2
(45) Date of Patent: Apr. 6, 2010

(54) METHOD OF PREPARING FUEL CELL COMPRISING PROTON CONDUCTING SOLID PEROVSKITE ELECTROLYTE MEMBRANE WITH IMPROVED LOW TEMPERATURE ION CONDUCTIVITY, AND MEMBRANE ELECTRODE ASSEMBLY OF FUEL CELL PREPARED BY THE METHOD

(75) Inventors: Joon-Hyung Shim, Stanford, CA (US); Sang-kyun Kang, Seoul (KR); Turgut M. Gür, Palo Alto, CA (US); Friedrich B. Prinz, Woodside, CA (US)

(73) Assignees: Samsung Electronics Co., Ltd., Suwon-si (KR); The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 11/931,745

(22) Filed: Oct. 31, 2007

(65) Prior Publication Data
US 2009/0110996 A1    Apr. 30, 2009

(51) Int. Cl.
*H01M 8/10*    (2006.01)
*H01M 4/00*    (2006.01)
*C23C 26/00*   (2006.01)

(52) U.S. Cl. .................. 429/40; 429/32; 429/30; 429/33; 427/115; 427/58; 427/126.3

(58) Field of Classification Search ............. 429/40, 429/32, 30, 33; 427/115
See application file for complete search history.

(56) References Cited

U.S. PATENT DOCUMENTS

| 4,948,680 A * | 8/1990 | Madou et al. ............... 429/13 |
| 7,381,492 B2 * | 6/2008 | Chen et al. ................ 429/30 |
| 2006/0252634 A1 * | 11/2006 | Kim et al. .................. 502/101 |

OTHER PUBLICATIONS

Joon Hyung Shim et al., "Ionic Conduction in Nanoscale Films of Yttrium-doped Barium Zirconate" presented at Fall Meeting Symposium on Nov. 27, 2006, Mechanical Engineering, Material Science Engineering, Stanford University, Stanford, California; *Mater. Res. Soc. Symp. Proc.*, vol. 972 © 2007 Materials Research Society.

* cited by examiner

*Primary Examiner*—Dah-Wei Yuan
*Assistant Examiner*—Angela J. Martin
(74) *Attorney, Agent, or Firm*—Stein McEwen, LLP

(57) ABSTRACT

Provided are a method of preparing a fuel cell and a membrane electrode assembly prepared by the method. The method includes preparing a substrate, forming a buffer layer having a single crystalline structure on the substrate, forming a proton conducting solid perovskite electrolyte membrane on the buffer layer, forming a first electrode on one surface of the proton conducting solid perovskite electrolyte membrane, etching the substrate, and forming a second electrode on the opposite surface of the one surface of the electrolyte membrane. Thus, the method of preparing a fuel cell can improve ion conductivity of an electrolyte membrane at a low temperature and a membrane electrode assembly of a fuel cell prepared by the method can improve ion conductivity at a low temperature.

19 Claims, 6 Drawing Sheets

KD Kreuer, Annu. Rev. Mater. Res., 33 (2003) 333

FIG. 9

METHOD OF PREPARING FUEL CELL COMPRISING PROTON CONDUCTING SOLID PEROVSKITE ELECTROLYTE MEMBRANE WITH IMPROVED LOW TEMPERATURE ION CONDUCTIVITY, AND MEMBRANE ELECTRODE ASSEMBLY OF FUEL CELL PREPARED BY THE METHOD

BACKGROUND OF THE INVENTION

1. Field of the Invention

The present invention relates to a method of preparing a fuel cell including a proton conducting solid perovskite electrolyte membrane and a membrane electrode assembly of a fuel cell prepared by the method, and more particularly, to a method of preparing a fuel cell including a proton conducting solid perovskite electrolyte membrane with improved low temperature ion conductivity and a membrane electrode assembly of a fuel cell prepared by the method.

2. Description of the Related Art

Recently, as portable electronic devices and wireless communication devices become popularized, more research into fuel cells as a portable power supply device and a clean energy source is being conducted.

Fuel cells are power generation systems in which chemical energy is converted into electrical energy through electrochemical reaction of fuel gas such as hydrogen or methanol with an oxidant such as oxygen or air.

Fuel cells are classified into phosphoric acid fuel cells, molten carbonate fuel cells, solid oxide fuel cells, polymer electrolyte fuel cells, alkali fuel cells, etc. according to the type of electrolyte used. Although theses fuel cells operate based on the same principle, they use different types of fuel, operational temperatures, catalysts, electrolytes, or the like.

Meanwhile, area specific resistance (ASR) of an electrolyte membrane follows the relation represented by Formula I with a thickness of the electrolyte membrane t and an absolute temperature T. Thus, in order to decrease resistance of the electrolyte membrane during the operation of the fuel cell, the thickness of the thin film t need be decreased or the operational temperature T need be increased to increase ion conductivity ($\sigma$).

$$ASR[\Omega^{*}cm2]=t/\sigma(T) \qquad \text{Equation 1}$$

where, temperature dependence of the ionic conductivity follows the Arrhenius relation represented by Equation 2 below.

$$\sigma(T)^{*}T=\sigma 0^{*}\exp(-Ea/kT) \qquad \text{Equation 2}$$

where, $\sigma 0$ is a constant, k is Boltzmann constant, and Ea is activation energy.

Meanwhile, the solid oxide electrolyte has been used at a high temperature of 600° C. or higher since it has low ionic conductivity at a low temperature compared with other electrolytes such as polymer electrolyte. However, when the fuel cell is used at a high temperature, problems such as a long time to reach a high temperature, thermal expansion due to extreme temperature difference between operation and non-operation and damage caused by the thermal expansion, reduction in durability of fuel cell material at a high temperature, and necessity of insulation due to difference between external and internal temperatures may occur.

ASR of commercialized fuel cells is about 0.1 $\Omega^{*}cm^{2}$, and preferably not higher than 1.0 $\Omega^{*}cm^{2}$. When a Nafion® polymer electrolyte is used, $\sigma$=0.1 S/cm at 80° C. Thus, when t=0.01 cm, ASR is 0.1 (0.01/0.1=0.1).

Figure 1:
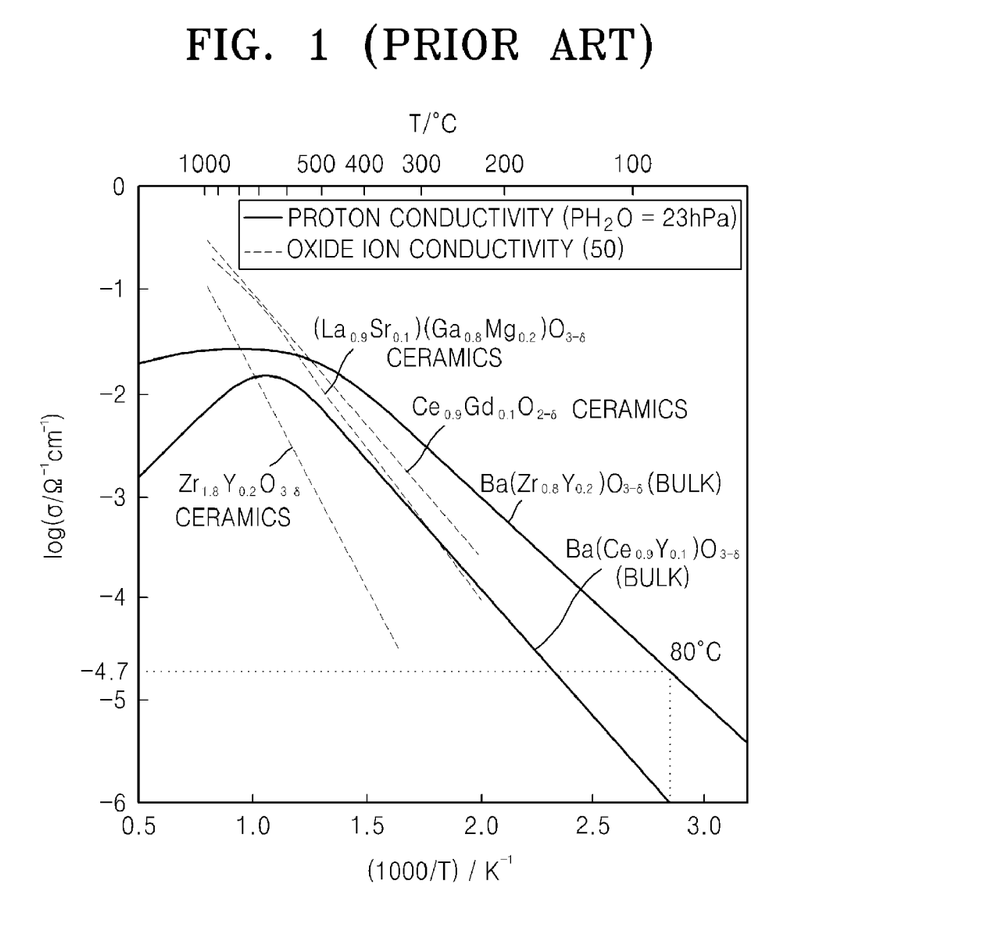
FIG. 1 is a graph illustrating difference of ion conductivity of proton conducting solid perovskite according to the temperature.

Meanwhile, according to FIG. 1 (K D Kreuer, Annu. Rev. Mater. Res., 33 (2003) 333), proton conductivity of $BaY_{0.2}Zr_{0.8}O_{3-\delta}$ at 80° C. is $10^{-4.7}$=2.0*$10^{-5}$ S/cm. In order to obtain a desired ASR (ASR=1.0 $\Omega^{*}cm^{2}$), t needs to be 200 nm (t=ASR*$\sigma$=1.0×2.0×$10^{-5}$=2.0*$10^{-5}$ cm=200 nm). Thus, the electrolyte membrane needs to be formed as a thin film with a sub-micron thickness. Since the sub-micron thin film cannot be formed by a conventional ceramic process using powder, methods such as RF sputtering, magnetron sputtering, sol-gel spin coating, pulsed laser deposition and chemical vapor deposition are required to prepare a thin ceramic film.

In the preparation of a thin film, the solid oxide forms granular structure which has nano- to micro-meter grain size according to the processing conditions. Mostly, ion conductivity in grain boundaries is far less than that in bulk particles.

Figure 2:
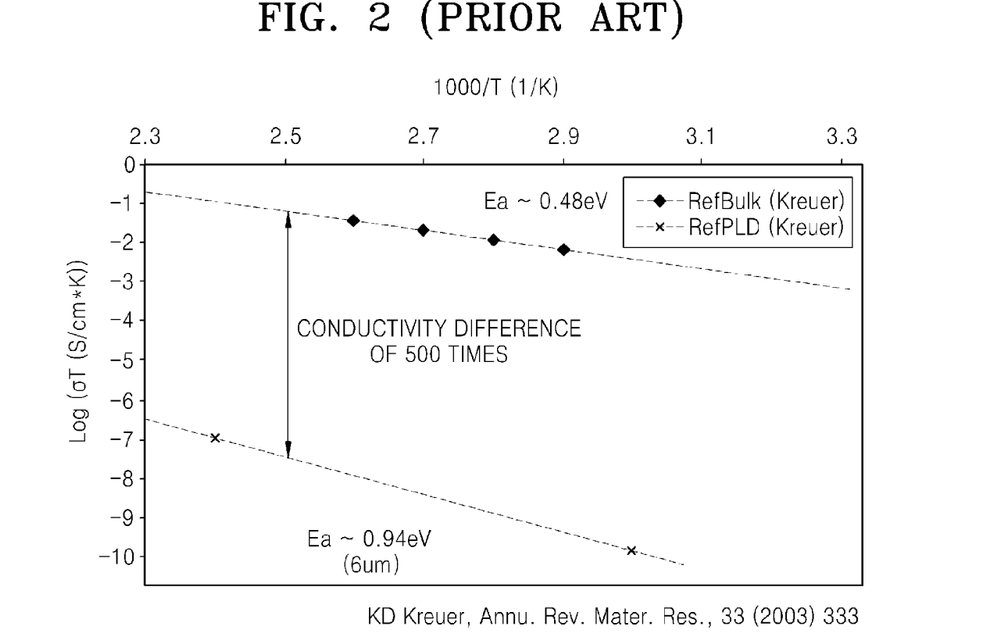
FIG. 2 shows difference of proton conductivity of Y:Ba-$ZrO_3$ according to micro structures.

For example, FIG. 2 shows difference of proton conductivity of $Y:BaZrO_3$ (BYZ in the following sentences) according to micro structures.

Referring to FIG. 2, the proton conductivity of an electrolyte membrane formed on a silicon substrate using pulsed laser deposition is about 500 times lower than that of a single crystalline bulk-structured electrolyte at 60° C. (2.38*$10^{-8}$ S/cm vs. 1.34*$10^{-5}$ S/cm).

Figure 3:
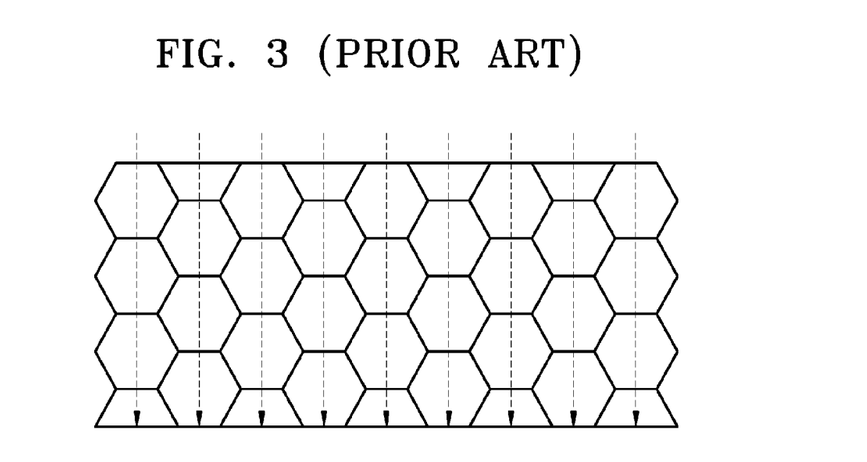
FIG. 3 shows an ion conduction path in a polycrystalline thin film ion conductor.

The electrolyte membrane has such a low proton conductivity ($\sigma$) since the electrolyte membrane formed on a substrate using a solid oxide electrolyte material has a polycrystalline structure as shown in FIG. 3. That is, the proton conductivity ($\sigma$) is decreased since grain boundaries of the solid oxide electrolyte material act as barrier to the ion conduction in the electrolyte membrane having the polycrystalline structure. In FIG. 3, ions are conducted in the direction indicated by arrows.

ASR of 50 nm thick electrolyte membrane formed of solid oxide electrolyte with such a low ionic conductivity ($\sigma$) (i.e., 2.38*$10^{-8}$ S/cm) will be 210 $\Omega^{*}cm^{2}$ (50 nm/2.38*$10^{-8}$ S/cm=50*$10^{-7}$ cm/2.38*$10^{-8}$ S/cm=210 $\Omega^{*}cm^{2}$). Accordingly, the use of the electrolyte membrane in the fuel cell will result in excess resistance loss, which will prohibit any meaningful power generation. In order to decrease the ASR to a desired level, t needs to be 2.4 Å according to the equation ASR=t/$\sigma$(T) (t=1.0*2.38*$10^{-8}$ cm=2.38*$10^{-8}$ cm=2.38*$10^{-1}$ nm=2.4 Å). However, since this value is less than a lattice constant of BYZ (4.19 Å), such a membrane cannot be formed. Accordingly, a fuel cell operating at a low temperature can be prepared only if ion conductivity of the electrolyte membrane formed by a thin film process can reach the same level of ion conductivity obtained in a bulk material.

SUMMARY OF THE INVENTION

The present invention provides a method of preparing a fuel cell including a proton conducting solid perovskite electrolyte membrane with improved low temperature ion conductivity and a membrane electrode assembly of a fuel cell prepared by the method.

According to an aspect of the present invention, there is provided a method of preparing a fuel cell, the method comprising:

(a) preparing a substrate;

(b) forming a buffer layer having a single crystalline structure on the substrate;

(c) forming a proton conducting solid perovskite electrolyte membrane on the buffer layer;

(d) forming a first electrode on one surface of the proton conducting solid perovskite electrolyte membrane;

(e) etching the substrate; and (f) forming a second electrode on the opposite surface of the one surface of the electrolyte membrane.

The order of steps may be (a)-(b)-(c)-(d)-(e)-(f) or (a)-(b)-(c)-(e)-(d)-(f).

The method may further include etching the buffer layer before step (f).

The proton conducting solid perovskite electrolyte membrane may be an epitaxial membrane.

The proton conducting solid perovskite electrolyte membrane may be at least one selected from the group of parent perovskites consisting of the barium zirconate (BZ), barium cerate (BC), strontium zirconate (SZ) and strontium cerate (SC) families doped with divalent and/or trivalent cations.

The buffer layer may have a cubic rock salt structure or a perovskite structure.

The substrate may include Si.

The proton conducting solid perovskite electrolyte membrane may be formed by sputtering, molecular beam epitaxy, pulsed laser deposition, chemical vapor deposition, or atomic layer deposition.

According to another aspect of the present invention, there is provided a fuel cell comprising:

a substrate in which at least one via hole is formed;

a buffer layer with a single crystalline structure formed on the substrate;

a proton conducting solid perovskite electrolyte membrane formed on the buffer layer to cover the via hole;

a first electrode formed on one surface of the proton conducting solid perovskite electrolyte membrane; and a second electrode formed on the opposite surface of the one surface of the proton conducting solid perovskite electrolyte membrane.

A lattice constant of the buffer layer may be in the rage of −10 to 10% of the lattice constant of the proton conducting solid perovskite electrolyte membrane.

The proton conducting solid perovskite electrolyte membrane may include BYZ and the buffer layer may include MgO or $SrTiO_3$.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a method of preparing a fuel cell according to the present invention will now be described more fully with reference to the accompanying drawings, in which exemplary embodiments of the invention are shown.

FIGS. 4A through 4G show a method of preparing a fuel cell according to an embodiment of the present invention.

Figure 4:
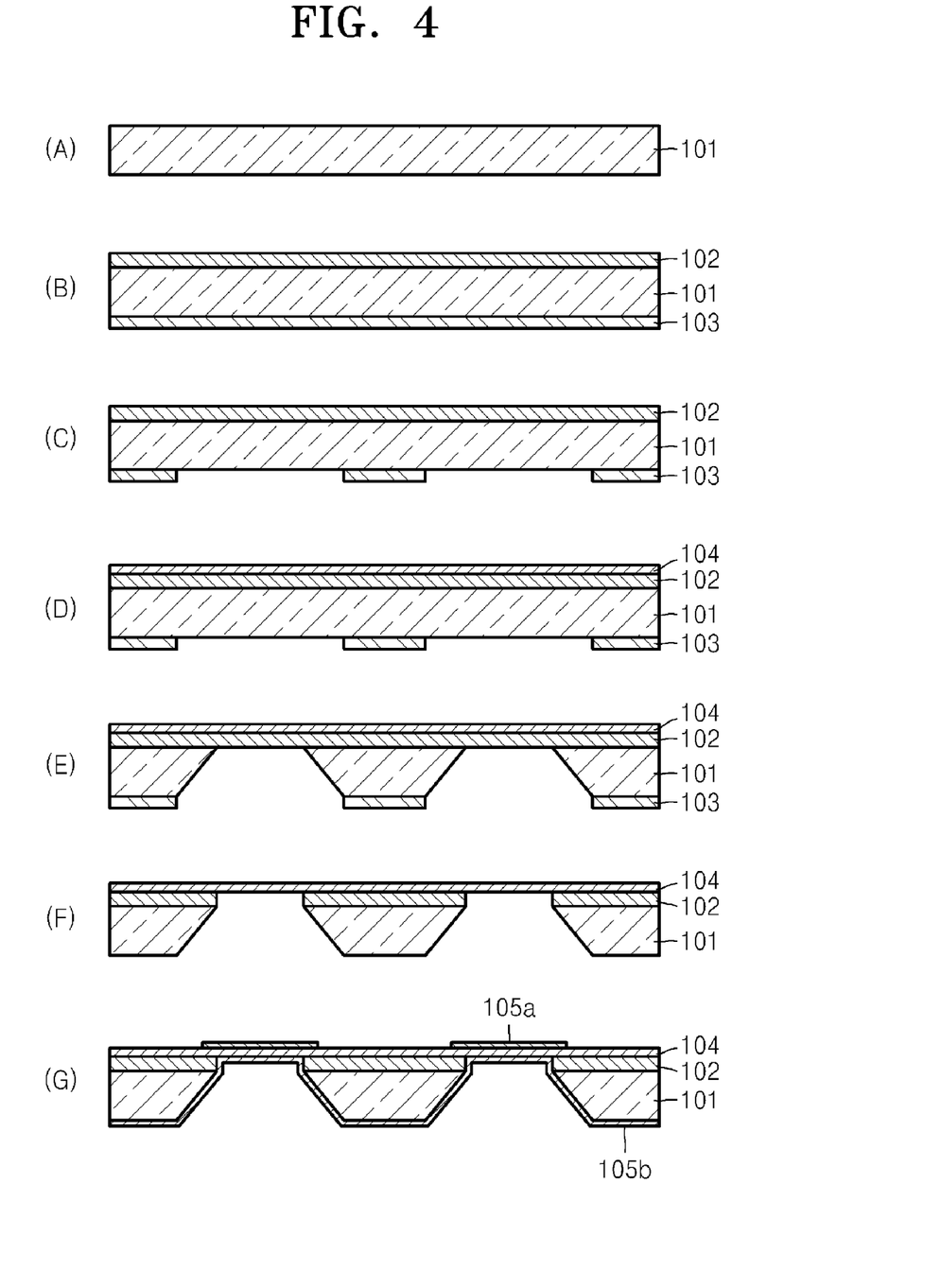
FIGS. 4A through 4G show a method of preparing a fuel cell according to an embodiment of the present invention.

Referring to FIG. 4, a method of preparing a fuel cell according to an embodiment of the present invention includes: preparing a substrate; forming a buffer layer having a single crystalline structure on one surface of the substrate; forming a substrate protection layer on the opposite surface of the one surface of the substrate; etching the substrate protection layer; forming a proton conducting solid perovskite electrolyte membrane on the buffer layer; forming one electrode on one surface of the proton conducting solid perovskite electrolyte membrane; etching the substrate; etching the buffer layer; and forming a second electrode on the opposite surface of the one surface of the proton conducting solid perovskite electrolyte membrane.

FIG. 4A shows a substrate 101. Here, the substrate 101 includes Si.

According to FIG. 4B, a buffer layer 102 and a substrate protection layer 103 are disposed respectively on both surfaces of the substrate 101. A single crystalline structure of the buffer layer 102 can grow an electrolyte membrane 104 as an epitaxial membrane having a large grain size. Particularly, the buffer layer 102 has a cubic rock salt structure or a perovskite structure. Such a buffer layer 102 can be deposited on one surface of the substrate 101 using pulsed laser deposition, sputtering, chemical vapor deposition, or the like. In addition, the substrate protection layer 103 protects the substrate 101 during an etching process of the substrate 101. Herein, the substrate protection layer 103 includes SiN.

FIG. 4C shows the substrate protection layer 103 a part of which is removed by an etching. A photoresist is deposited on the substrate protection layer 103, exposed to a predetermined pattern and developed, and dry etched to etch the substrate protection layer 103, although this process is not described herein.

FIG. 4D shows a proton conducting solid perovskite electrolyte membrane 104 formed on the buffer layer 102. Examples of the proton conducting solid perovskite electrolyte membrane 104 are at least one selected from the group of parent perovskites consisting of the BZ, BC, SZ and SC families doped with divalent and/or trivalent cations. In addition, the proton conducting solid perovskite electrolyte membrane 104 can be formed on the buffer layer 102 using sputtering, molecular beam epitaxy, pulsed laser deposition, chemical vapor deposition, atomic layer deposition, or the like.

Figure 5:
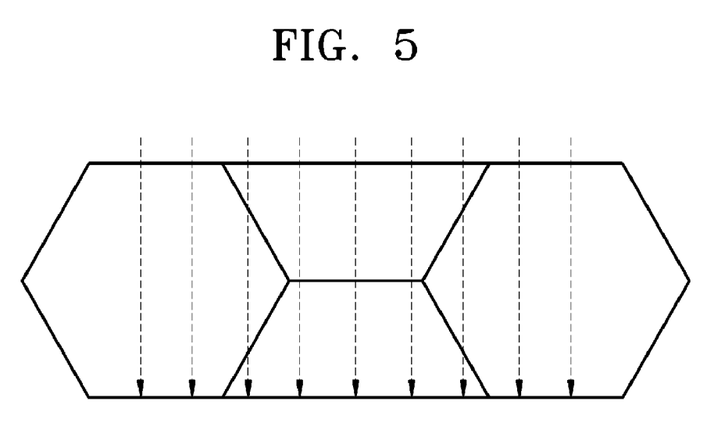
FIG. 5 shows an ion conduction path in a thin film ion conductor having a large grain size.

In addition, the buffer layer 102 may have a lattice constant (LC) similar to that of the proton conducting solid perovskite electrolyte membrane 104. Particularly, the LC of the buffer layer 102 may be in the range of −10 to 10% of the LC of the proton conducting solid perovskite electrolyte membrane 104. The proton conducting solid perovskite electrolyte membrane 104 is deposited on the buffer layer 102 whose lattice constant is similar to that of the proton conducting solid perovskite electrolyte membrane 104 to epitaxially grow the proton conducting solid perovskite electrolyte membrane 104 with a large grain size as shown in FIG. 5. According to FIG. 5, the proton conducting solid perovskite electrolyte membrane 104 which has a large grain size similar to the thickness of the proton conducting solid perovskite electrolyte membrane 104 has a near single crystalline structure (or a structure similar to the single crystalline structure), and thus grain boundaries, particularly grain boundaries in the direction perpendicular to ion conduction path (the direction indicated by the arrows), are decreased. Accordingly, since the ease of ion conduction can be increased, ionic conductivity can be increased.

Lattice constants and crystal structure of various materials are shown in Table 1.

TABLE 1

|  | BYZ | MgO | SrTiO$_3$ | Si | LaAlO$_3$ |
|---|---|---|---|---|---|
| Lattice constant (LC), Å | 4.19 | 4.21 | 3.91 | 5.43 | 5.36 |
| Crystal structure | perovskite | NaCl cubic | perovskite | diamond | Rhombohedral |

As shown Table 1, for the similarity of the lattice constant, when BYZ is used as the proton conducting solid perovskite electrolyte membrane 104, MgO or SrTiO$_3$ may be preferably used as the buffer layer 102. When BYZ is used as the proton conducting solid perovskite electrolyte membrane 104 and MgO or SrTiO$_3$ is used as the buffer layer 102, the lattice constant of the buffer layer 102 is respectively 0.5% and −6.7% of the lattice constant of the electrolyte membrane 104.

FIG. 4E shows an etched substrate 101. The substrate 101 may be etched using a KOH solution. Here, one surface of the substrate 101 which is covered and protected by the substrate protection layer 103 is not etched.

FIG. 4F shows an etched buffer layer 102, wherein the substrate protection layer 103 is completely removed. The etching the buffer layer 102 may be performed using a plasma etching and the etching the substrate protection layer 103 may be performed using a dry etching.

According to FIG. 4G, a first electrode 105a is disposed on one surface of the electrolyte membrane 104 and a second electrode 105b is disposed on the opposite surface of the one surface of the electrolyte membrane 104. The first electrode 105a may be formed on the electrolyte membrane 104 before and after etching the substrate 101 and/or buffer layer 102. The first electrode 105a may be formed by (i) depositing a photoresist on the electrolyte membrane 104, (ii) exposing the photoresist to a predetermined pattern and developing, (iii) depositing the first electrode 105a on the exposed electrolyte membrane 104, and (iv) removing the photoresist, although the process is not shown herein. The second electrode 105b contacts with the surfaces of the substrate 101, the buffer layer 102 and the electrolyte membrane 104.

Figure 6:
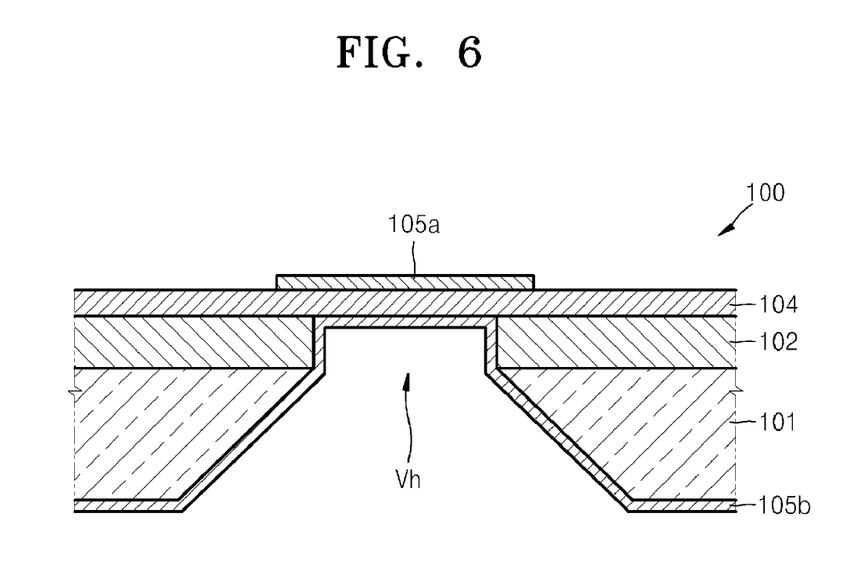
FIG. 6 shows a cross-sectional view of a membrane electrode assembly (MEA) of a fuel cell prepared according to the method of FIG. 4.

FIG. 6 shows a cross-sectional view of a membrane electrode assembly (MEA) of a fuel cell prepared according to the method of FIG. 4.

Referring to FIG. 6, a membrane electrode assembly 100 of a fuel cell according to the present invention includes a substrate 101, a buffer layer 102, a proton conducting solid perovskite electrolyte membrane 104, a first electrode 105a and a second electrode 105b.

At least one via hole ($V_h$) is formed in the substrate 101.

The buffer layer 102 which is formed on the substrate 101 may have a single crystalline structure.

The proton conducting solid perovskite electrolyte membrane 104 may be disposed on the buffer layer 102 to cover the via hole ($V_h$).

The first electrode 105a is formed on one surface of the electrolyte membrane 104, and the second electrode 105b is formed on the opposite surface of the one surface of the electrolyte membrane 104. Particularly, the second electrode 105b is deposited to cover a surface of the electrolyte membrane 104, i.e., an opposite surface of the first electrode 105a, the substrate 101 and the buffer layer 102.

EXAMPLE

Figure 7:
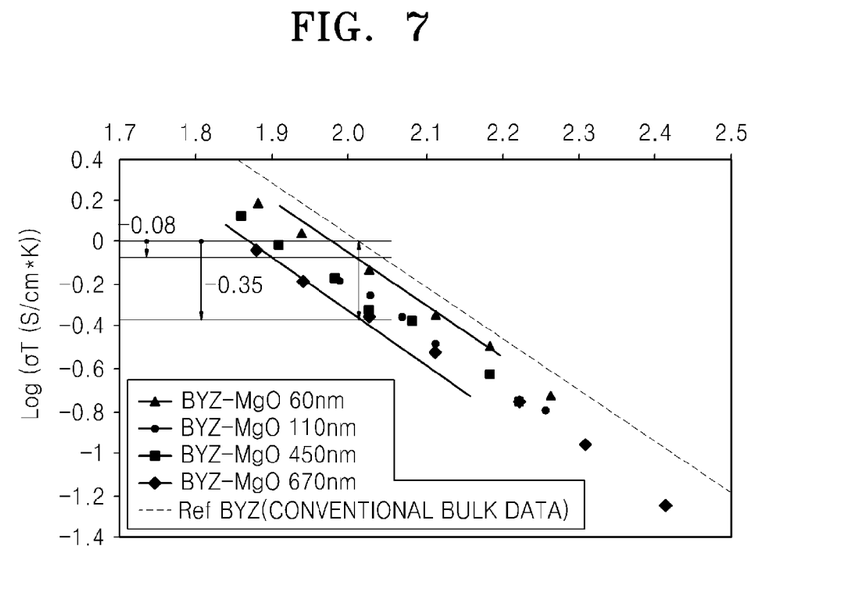
FIG. 7 is a graph illustrating proton conductivity ($\sigma$) of $BaZr_{0.8}Y_{0.2}O_{3-\delta}$ membrane formed on a single crystalline MgO buffer layer according to the thickness of the $BaZr_{0.8}Y_{0.2}O_{3-\delta}$ membrane.
Figure 8:
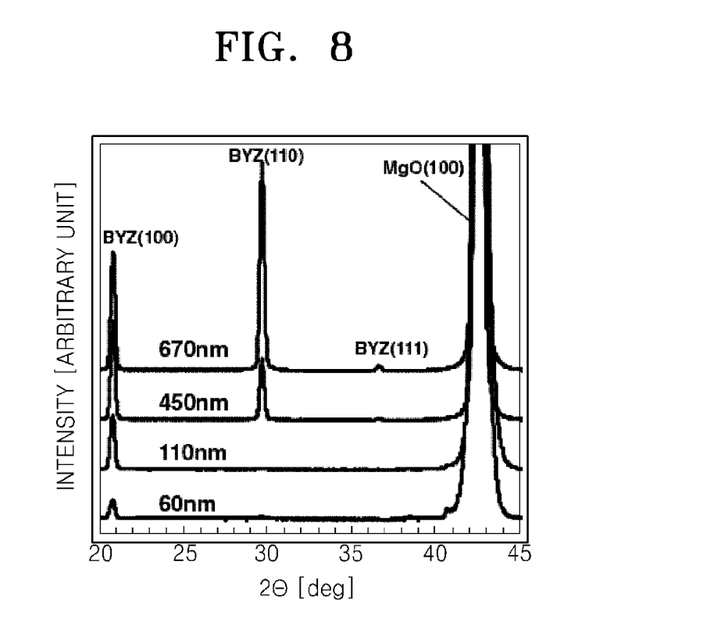
FIG. 8 is a graph illustrating XRD patterns of PLD BYZ membrane grown on a single crystalline MgO buffer layer.
Figure 9:
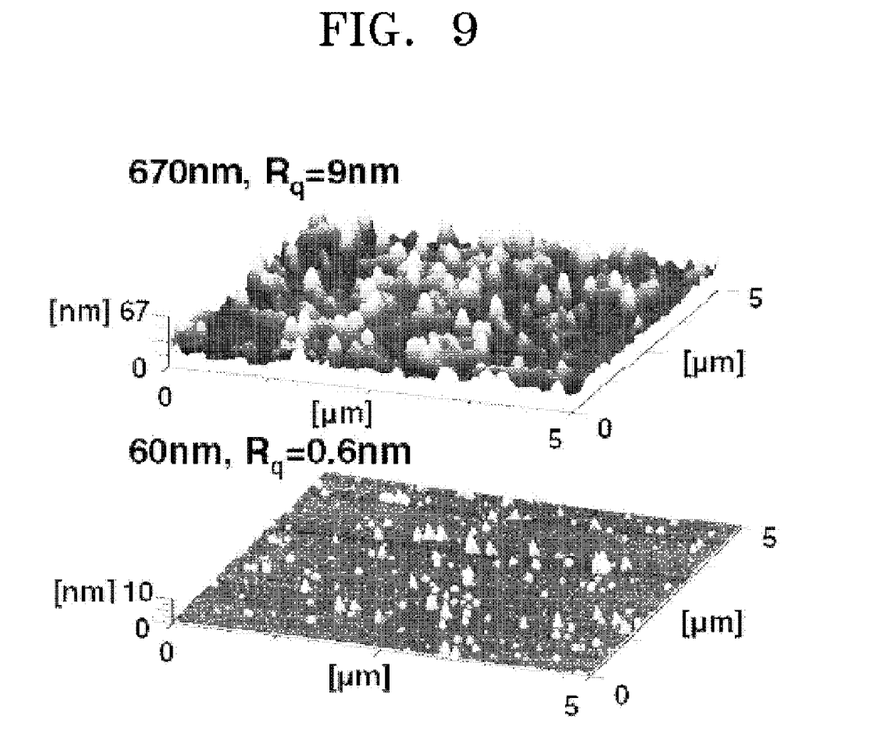
FIG. 9 shows atomic force microscope (AFM) surface images of the thickest (670 nm) and thinnest (60 nm) BYZ membranes.

In an MgO-BYZ membrane-electrode sample simulating a membrane electrode assembly 100 of a fuel cell shown in FIG. 6, proton conductivity difference according to the thickness of a proton conducting solid perovskite electrolyte membrane 104, XRD patterns and surface morphology were measured and the results are shown in FIGS. 7, 8 and 9 respectively.

Here, Si was used as a substrate 101 and MgO (100) whose lattice constant is 4.21 Å was used as a buffer layer 102. A sintered BYZ pellet (Praxair Inc.) was used as a target material to grow a BYZ membrane. The composition of the pellet was $BaZr_{0.8}Y_{0.20}O_{3-\delta}$. Here, δ is required to meet the overall charge neutrality. A Lambda Physik 248 nm KrF laser with an energy density of 3.0 J/cm$^2$ was used to ablate the target material. Substrate temperature was set at 780° C. during deposition and the pressure of the background oxygen was 300 mTorr. After deposition, MgO-BYZ samples were cooled down at oxygen pressure of 300 Torr for 30 minutes. The resulting deposition rate was about 0.3 Å/pulse under these conditions.

While the thickness of the BYZ membrane was varied to 60, 110, 450 and 670 nm, a number of MgO-BYZ membrane samples were prepared. Each MgO-BYZ membrane sample had dense titanium electrodes deposited by DC sputtering on the surface of BYZ membrane, and platinum was coated on the surface of titanium to prevent oxidation during high temperature measurement.

Then, planar conduction measurement was performed in the direction parallel to the BYZ membrane surface.

FIG. 7 is a graph illustrating proton conductivity (σ) of BYZ membrane formed on a single crystalline MgO buffer layer according to the thickness of the $BaZr_{0.8}Y_{0.2}O_{3-\delta}$ membrane.

AC impedance spectroscopy measurements were conducted using a Solartron 1260/1287 system. Impedance of the BYZ membrane was measured by sweeping frequency from 50,000 Hz to 0.1 Hz at amplitude of 100 mV at atmospheric pressure.

From the measured impedance data, the relationship between impedance and temperature was investigated. The measured impedance data of the BYZ membrane is considered as resistance. The measured data follows the linear Arrhenius relation represented by Equation 2 as shown in FIG. 7.

Referring to FIG. 7, the BYZ membrane according to an embodiment of the present invention has proton conductivity (σ) which is in the range of 45 to 83% ($10^{-0.08}$=83%, $10^{-0.35}$=45%) of proton conductivity (σ) of a conventional single crystalline BYZ bulk. When considering about 500 times difference of ion conductivity as shown in FIG. 2, this result is dramatically increased. Thus, a fuel cell employing the membrane electrode assembly 100 of the present invention can be operated at a low temperature due to high ion conductivity of the electrolyte membrane 104.

FIG. 8 is a graph illustrating XRD patterns of PLD BYZ membrane grown on a single crystalline MgO buffer layer 100.

Referring to FIG. 8, in the XRD analyses, 60 nm and 110 nm BYZ membranes showed reflection peaks only in [100] direction. In comparison, thicker membranes of 450 nm and 670 nm BYZ membranes showed polycrystalline behavior since reflection peaks are observed in [110] and [111] directions in addition to the [100] direction.

FIG. 9 shows atomic force microscope (AFM) surface images of the thickest (670 nm) and thinnest (60 nm) BYZ membranes. Here, samples of the BYZ membrane was cut into pieces with 5×5 µm² size, and AFM surface images thereof were obtained. In addition, Rq indicates a mean variation.

Referring to FIG. 9, clear formation of grains and grain boundaries in the thick BYZ membranes (450 nm and 670 nm) was observed. In comparison, the thin BYZ membranes (60 nm and 110 nm) seemed relatively continuous and flat.

According to the present invention, a method of preparing a fuel cell including a proton conducting solid perovskite electrolyte membrane with improved low temperature ion conductivity and a membrane electrode assembly of a fuel cell prepared by the method can be provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of preparing a fuel cell, the method comprising:
   preparing a substrate;
   forming a buffer layer having a single crystalline structure on the substrate;
   forming a proton conducting solid perovskite electrolyte membrane on the buffer layer;
   forming a first electrode on one surface of the proton conducting solid perovskite electrolyte membrane;
   etching the substrate and the buffer layer to expose a portion of an opposite surface of the proton conducting solid perovskite electrolyte membrane; and
   forming a second electrode on the exposed portion of the opposite surface of the proton conducting solid perovskite electrolyte membrane.

2. The method of claim 1, wherein the method is performed in the order of preparing the substrate, forming the buffer layer, forming the proton conducting solid perovskite electrolyte membrane, forming the first electrode, etching the substrate and the buffer layer, and forming the second electrode, or
   the method is performed in the order of preparing the substrate, forming the buffer layer, forming the proton conducting solid perovskite electrolyte membrane, etching the substrate and the buffer layer, forming the first electrode, and forming the second electrode.

3. The method of claim 1, wherein the etching of the substrate and the buffer layer are separate operations.

4. The method of claim 1, wherein the proton conducting solid perovskite electrolyte membrane is an epitaxial membrane.

5. The method of claim 1, wherein the proton conducting solid perovskite electrolyte membrane is at least one selected from the group of parent perovskites consisting of the barium zirconate (BZ), barium cerate (BC), strontium zirconate (SZ) and strontium cerate (SC) families doped with divalent and/or trivalent cations.

6. The method of claim 1, wherein the buffer layer has a cubic rock salt structure or a perovskite structure.

7. The method of claim 1, wherein a lattice constant of the buffer layer is in the range of −10 to 10% of the lattice constant of the proton conducting solid perovskite electrolyte membrane.

8. The method of claim 7, wherein the proton conducting solid perovskite electrolyte membrane comprises yttrium-doped barium zirconate (BYZ) and the buffer layer comprises MgO or $SrTiO_3$.

9. The method of claim 1, wherein the substrate comprises Si.

10. The method of claim 1, wherein the proton conducting solid perovskite electrolyte membrane is formed by sputtering, molecular beam epitaxy, pulsed laser deposition, chemical vapor deposition, or atomic layer deposition.

11. A fuel cell comprising:
    a substrate in which at least one via hole is formed;
    a buffer layer with a single crystalline structure formed on the substrate and at least one via hole aligned with the at least one via hole of the substrate;
    a proton conducting solid perovskite electrolyte membrane formed on the buffer layer to cover the via holes of the substrate and the buffer layer;
    a first electrode formed on one surface of the proton conducting solid perovskite electrolyte membrane; and
    a second electrode formed on an opposite surface of the proton conducting solid perovskite electrolyte membrane, the opposite surface being exposed through the substrate and the buffer layer by the via holes.

12. The fuel cell of claim 11, wherein a lattice constant of the buffer layer is in the rage of −10 to 10% of the lattice constant of the proton conducting solid perovskite electrolyte membrane.

13. The fuel cell of claim 12, wherein the proton conducting solid perovskite electrolyte membrane comprises yttrium-doped barium zirconate (BYZ) and the buffer layer comprises MgO or $SrTiO_3$.

14. The method of claim 1, wherein the etching of the substrate and the buffer layer includes forming a via hole through the substrate and the buffer layer to expose the portion of the opposite surface of the proton conducting solid perovskite electrolyte membrane.

15. The method of claim 14, wherein the second electrode is formed in the via hole to cover etched portions of the substrate and the buffer layer, and on the exposed portion of the opposite surface of the portion conducting solid perovskite electrolyte membrane.

16. The method of claim 14, wherein the first electrode is formed on a portion of the one surface of the proton conducting solid perovskite electrolyte membrane that corresponds to the via hole.

17. The fuel cell of claim 11, wherein the via hole is formed through the substrate and the buffer layer by etching.

18. The fuel cell of claim 17, wherein the second electrode is formed in the via hole to cover etched portions of the substrate and the buffer layer, and on the exposed portion of the opposite surface of the proton conducting solid perovskite electrolyte membrane.

19. The fuel cell of claim 17, wherein the first electrode is formed on a portion of the one surface of the proton conducting solid perovskite electrolyte membrane that corresponds to the via hole.

\* \* \* \* \*